(12) United States Patent
Bookbinder et al.

(10) Patent No.: US 10,302,013 B2
(45) Date of Patent: May 28, 2019

(54) COMPOSITE THERMAL BARRIER FOR COMBUSTION CHAMBER SURFACES

(71) Applicant: Corning Incorporated, Corning, NY (US)

(72) Inventors: Dana Craig Bookbinder, Corning, NY (US); Roy Joseph Bourcier, Corning, NY (US); William Edward Lock, Horseheads, NY (US); Richard Curwood Peterson, Elmira Heights, NY (US); Irene Marjorie Slater, Lindley, NY (US); Pushkar Tandon, Painted Post, NY (US); Christopher John Warren, Waverly, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/278,696

(22) Filed: Sep. 28, 2016

(65) Prior Publication Data

US 2017/0089260 A1 Mar. 30, 2017

Related U.S. Application Data

(60) Provisional application No. 62/235,013, filed on Sep. 30, 2015.

(51) Int. Cl.
*F02B 77/11* (2006.01)
*F02F 3/00* (2006.01)
(Continued)

(52) U.S. Cl.
CPC ............... *F02B 77/11* (2013.01); *B32B 3/12* (2013.01); *B32B 7/02* (2013.01); *B32B 15/00* (2013.01);
(Continued)

(58) Field of Classification Search
CPC .. F02B 77/11; F02B 77/02; F02B 2023/0612; F02F 3/10; F02F 3/0084
See application file for complete search history.

(56) References Cited

U.S. PATENT DOCUMENTS

| 1,719,215 A | 7/1929 | Faroy et al. |
| 4,405,284 A | 9/1983 | Albrecht et al. |

(Continued)

FOREIGN PATENT DOCUMENTS

WO 2015134162 A1 9/2015

OTHER PUBLICATIONS

Kascak et al. "Gas Turbine Ceramic-Coating-Vane Concept with Convection-Cooled Porous Metal Core" Technical Paper 1942, TR 81-C-7 15 pgs.

(Continued)

*Primary Examiner* — Long T Tran
(74) *Attorney, Agent, or Firm* — Russell S. Magaziner

(57) ABSTRACT

A composite thermal barrier and methods of applying the composite thermal barrier to a metallic surface within a combustion chamber of an engine. The composite thermal barrier includes at least one metallic support structure, a metallic skin, and an insulation material. The metallic support structure is connected to a metallic surface within the combustion chamber of the engine. The metallic skin is disposed adjacent to the metallic support structure to define a void space between the metallic skin and the metallic surface. The insulation material is contained within the volume to form the composite thermal barrier.

20 Claims, 11 Drawing Sheets

(51) Int. Cl.
*F02F 3/26* (2006.01)
*B32B 7/02* (2019.01)
*B32B 15/00* (2006.01)
*B32B 15/16* (2006.01)
*B32B 3/12* (2006.01)
*F02F 1/18* (2006.01)

(52) U.S. Cl.
CPC ............ *B32B 15/16* (2013.01); *F02F 3/26* (2013.01); *B32B 2307/304* (2013.01); *B32B 2315/02* (2013.01); *F02F 1/18* (2013.01); *F02F 3/0015* (2013.01); *F02F 3/0084* (2013.01); *F02F 2200/00* (2013.01)

(56) References Cited

U.S. PATENT DOCUMENTS

| | | | |
|---|---|---|---|
| 4,530,884 | A | 7/1985 | Erickson et al. |
| 4,531,502 | A | 7/1985 | Mizuhara |
| 4,604,945 | A | 8/1986 | Mizuhara |
| 4,631,502 | A | 12/1986 | Tran Kiem |
| 4,863,807 | A | 9/1989 | Krasicky, Jr. |
| 5,371,944 | A * | 12/1994 | Guenther ............ F02B 23/0603 123/669 |
| 5,384,200 | A | 1/1995 | Giles et al. |
| 5,404,639 | A * | 4/1995 | Guenther ............ F02B 23/0603 123/669 |
| 5,413,877 | A | 5/1995 | Griffith |
| 5,722,379 | A | 3/1998 | Binder et al. |
| 6,235,370 | B1 | 5/2001 | Merrill et al. |
| 6,511,762 | B1 | 1/2003 | Lee et al. |
| 8,813,734 | B2 * | 8/2014 | Kadoshima ............ F02B 77/11 123/193.1 |
| 8,893,693 | B2 | 11/2014 | Hijii et al. |
| 9,284,911 | B2 | 3/2016 | Tomita et al. |
| 2005/0279296 | A1 | 12/2005 | Coney et al. |
| 2012/0082841 | A1 * | 4/2012 | Kadoshima ............ F02B 77/11 428/312.6 |
| 2012/0097125 | A1 * | 4/2012 | Doss .................... F02F 3/0015 123/193.6 |
| 2013/0146041 | A1 * | 6/2013 | Hijii ....................... C25D 11/04 123/668 |
| 2013/0239924 | A1 * | 9/2013 | Sato ........................ F02B 77/02 123/198 R |
| 2014/0352646 | A1 * | 12/2014 | Tomita .................... C04B 41/89 123/193.5 |
| 2015/0204233 | A1 * | 7/2015 | Nanba ...................... F02F 1/18 123/668 |

OTHER PUBLICATIONS

International Search Report and Written Opinion PCT/US2016/054377 dated Dec. 14, 2016.
International Search Report and Written Opinion PCT/US2016/054580 dated Jan. 2, 2017.
Parker, D.A. and Donnison, G.M., "The Development of an Air Gap Insulated Piston" SAE Paper No. 870652, Detroit, Feb. 1987.
Richards, "Plasma Spray Deposition of Tri-Layer Environmental Barrier Coatings", Journal of the European Ceramic Society, vol. 34, 2014, pp. 3069-3083.
Schmitt, "Multilayer Thermal Barrier Coating (TBC) Architectures Utilizing Rare Earth Doped YSZ and Rare Earth Pyrochlores", Surface and Coating Technology, V. 251, 2014, pp. 56-63.
Viswanathan, "Engineered Multilayer Thermal Barrier Coatings for Enhanced Durability and Functional Performance", J. Am. Ceram. Soc., 97[9], 27709-2778, 2014.
Fred Landis, Gas-turbine engine, Aug. 23, 2015, Encyclopedia Britannica (Year: 2015).
Gupta et al., Study the Importance of Insulated Combustion Chamber with & Without Catalyst Inside the Combustion Chamber on the Performance of Four Stoke C.I. Engine, Aug. 2012, International Journal of Engineering Research & Technology (JERT), vol. 1, Issue 6 (Year: 2012).
Wilber et al., The Effect of Thermal Cycling on the Mechanical Failure of Alumina Scales formed on Commercial FeCrAl-RE Alloys, 1999, Maney Publishing, 133-136 (Year: 1999).
Litovsky et al., "Gas Pressure and Temperature Dependences of Thermal Conductvity of Porous Ceramic Materials: Part 2, Refractoried and Ceramics with Porosity Exceeding 30%," Journal of the American Ceramic Society 79(5), 1996. pp. 1366-1376.

* cited by examiner

COMPOSITE THERMAL BARRIER FOR COMBUSTION CHAMBER SURFACES

This application claims the benefit of priority under 35 U.S.C. § 119 of U.S. Provisional Application Ser. No. 62/235,013 filed on Sep. 30, 2015, the content of which is relied upon and incorporated herein by reference in its entirety.

BACKGROUND

Field

The present disclosure relates generally to composite thermal barriers for combustion chamber surfaces in an internal combustion engine.

Technical Background

The efficiency of internal combustion engines may be improved by retaining heat from ignited fuel in the combustion chamber. This can be accomplished by minimizing heat loss to the surrounding engine. One solution has been to insulate parts of the combustion chamber. A problem with insulating the combustion chamber from the surrounding engine may be creating a reliable bond between the thermal barrier and combustion chamber component surfaces.

Accordingly, a need exists for improved thermal barriers within internal combustion engines.

SUMMARY

According to one embodiment of the present disclosure, a composite thermal barrier is disclosed. In embodiments, the composite thermal barrier comprises at least one metallic support structure, a metallic skin, and an insulation material. In embodiments, the metallic support is connected to the metallic surface within a combustion chamber of an internal combustion engine. In embodiments, the metallic skin is disposed adjacent to the support structure and defines a void space between the metallic skin and the metallic surface. In embodiments, the insulation material is contained within the void space between the metallic skin and the metallic surface.

According to another embodiment of the present disclosure, a composite thermal barrier is disclosed. In embodiments, the composite thermal barrier comprises at least one metallic support structure, a metallic skin, and an insulation material. In embodiments, the metallic support is connected to the metallic surface of a piston within a combustion chamber of an internal combustion engine. In embodiments, the metallic skin is disposed adjacent to the support structure and defines a void space between the metallic skin and the piston metallic surface. In embodiments, the insulation material is contained within the void space between the metallic skin and the piston metallic surface.

According to yet another embodiment of the present disclosure, a method of applying a composite thermal barrier is disclosed. In embodiments, the method includes preparing a metallic surface within a combustion chamber of an engine for application of the thermal barrier composite. In embodiments, the method includes applying the at least one metallic support structure to the metallic surface. In embodiments, the method includes forming a metallic skin contiguous the support structure to create a void space between the metallic skin and the metallic surface. In embodiments, the method includes inserting the insulation material within the void space between the metallic skin and the metallic surface.

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings.

DETAILED DESCRIPTION

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the exemplary methods and materials are described below.

Figure 3:
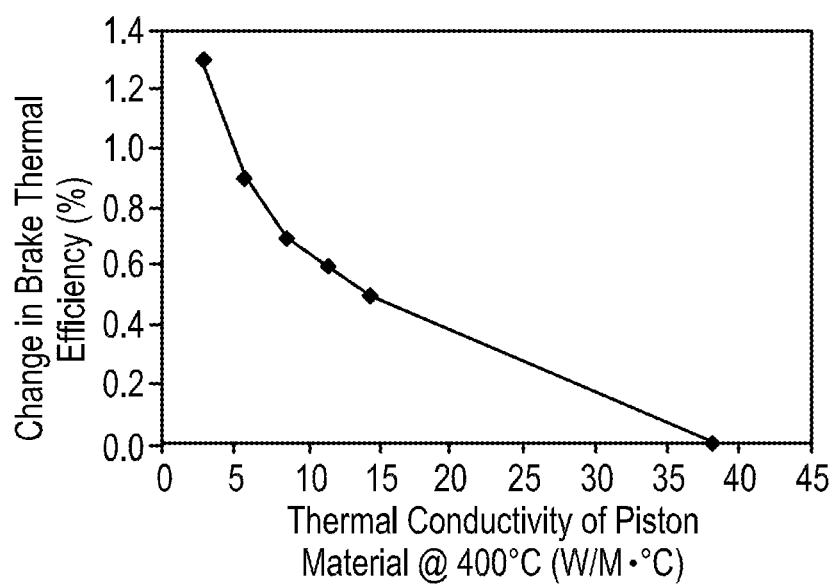
FIG. 3 is a plot of change in brake thermal efficiency (%) of an internal combustion engine at cruise operating conditions vs. piston thermal conductivity at 400° C. (W/m·° C.).

Engine fuel efficiency is affected by the thermal conductivity of the materials used to make the various components of an engine. This is particularly true for components within the combustion chamber of an engine (e.g., wall of the combustion chamber, pistons, valves, exhaust ports, manifolds, etc.). The higher the thermal conductivity of materials used in the combustion chamber, the more combustion energy lost to heat energy. By lowering the thermal conductivity of materials directly exposed to the combustion reaction, more energy of combustion is available for performing work and powering the engine (i.e., to drive the piston). That is, heat of combustion that is not lost to heat energy can be used to drive a turbocharger in the exhaust manifold and/or more effectively light off the catalytic converter during a cold-start of the engine. Accordingly, the overall efficiency of the engine (including fuel efficiency) may be improved with thermally resistant materials. FIG. 3 provides a plot of change in brake thermal efficiency (%) of an internal combustion engine at cruise operating conditions vs. the piston material's thermal conductivity at 400° C. (W/m·° C.). FIG. 3 illustrates the effect of piston material thermal conductivity on brake thermal efficiency of an engine at cruise operating conditions. The trend of FIG. 3 evidences that the increase in efficiency of an engine at cruise conditions may improve exponentially by reducing the thermal conductivity of materials (for the appropriate temperature range) used within the combustion chamber.

Conventional methods for lowering the thermal conductivity of materials within the combustion chamber have included the use of thermal barriers. Conventional thermal barriers for combustion chambers of internal combustion engines may have one or more of several problems. One major shortcoming for conventional thermal barriers may be that the thermal barrier spalls or separates from the surface within the combustion chamber when exposed to the violent combustion kinetics, high pressures (e.g., 10 bars-200 bars), and high temperatures (e.g., 1000° C.-3000° C.) therein. Spalling of thermal barriers including brittle ceramic materials into the combustion chamber can cause damage (e.g., gouge, plug, etc.) to other engine components and the catalytic convertor. Another shortcoming of conventional thermal barriers may be insufficient thermal resistivity properties or a different coefficient of thermal expansion (CTE) than the combustion chamber surface which may lead to separation at high temperatures. Yet another shortcoming may be non-uniform thicknesses of conventional thermal barriers on engine component surfaces.

Figure 1:
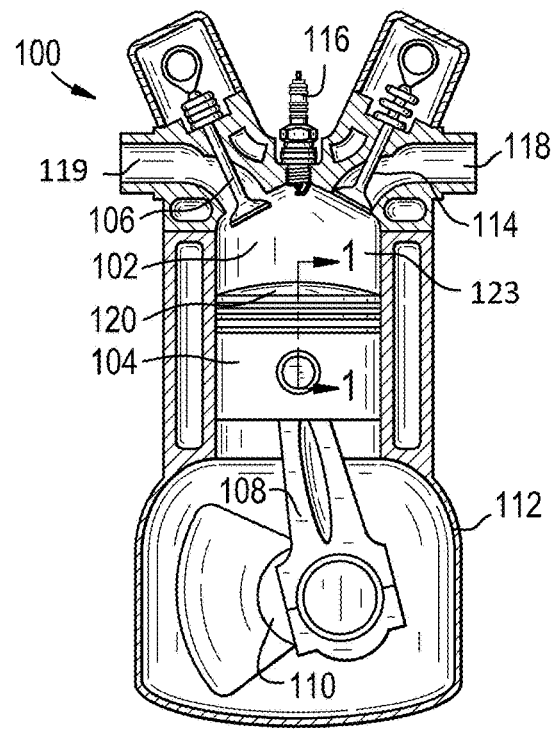
FIG. 1 is cross-sectional view of a combustion chamber in an engine during an intake stroke according to an exemplary embodiment.
Figure 2:
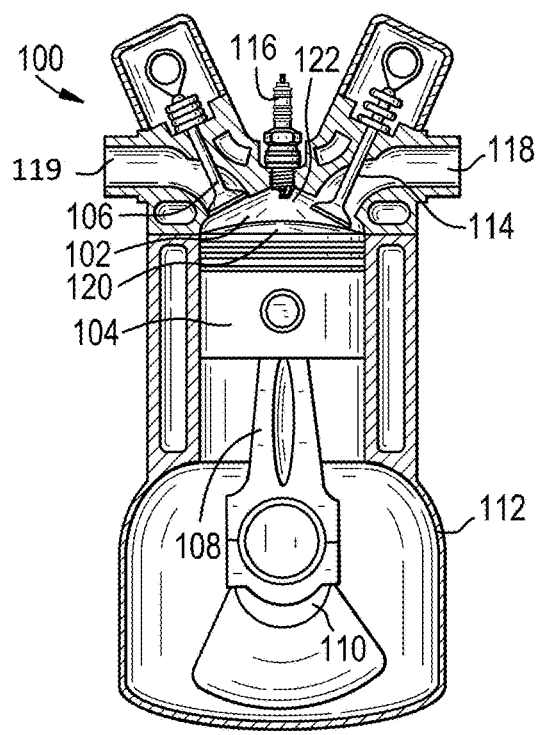
FIG. 2 is cross-sectional view of the combustion chamber in the engine of FIG. 1 during an exhaust stroke according to an exemplary embodiment.

The present application is directed to a composite thermal barrier 200 on any metallic surface within an internal combustion engine 100. FIG. 1 provides a cross-sectional view of example engine 100 during an intake stroke. FIG. 2 provides another cross-sectional view of example engine 100 with piston 104 in a full-exhaust stroke position. Engine 100 of the present disclosure may be gasoline, diesel, natural gas, propane, or any other liquid or gas hydrocarbon powered internal combustion engine. Engine 100 includes a number of components including a combustion chamber 102 with a piston 104 therein. Piston 104 is connected to a crankshaft 110 by a connecting rod 108 within a crankcase 112 of engine 100. Piston 104 includes a top surface 120 adjacent combustion chamber 102. Piston 104 may be made from carbon steel, aluminum, or other metals typically used in automotive applications. An intake valve 106, an intake valve 119, an exhaust valve 114, an exhaust duct 118, and a spark/glow plug 116 are also adjacent combustion chamber 102. Of course other components and configurations of engine 100 are possible and are in accordance with the present disclosure.

In FIG. 2, intake valve 106 is closed and exhaust valve 114 is open (when piston 104 is at a full-exhaust stroke position) connecting exhaust duct 118 with combustion chamber 102 and thereby forming a chamber exhaust volume 122. Chamber exhaust volume 122 is defined by wall surfaces and end surfaces of combustion chamber 102, a surface of intake valve 106, a surface of exhaust valve 114, top surface 120 of piston 104, and walls of exhaust duct 118. In another embodiment, intake valve 106 and exhaust valve 114 are closed (when piston 104 is at a full-compression stroke position) thereby forming a chamber compression volume 121 (not shown). Chamber compression volume 121 is defined by walls and top surfaces of combustion chamber 102, a surface of intake valve 106, a surface of exhaust valve 114, and top surface 120 of piston 104. In yet another embodiment, intake valve 106 is open and exhaust valve 114 is closed (when piston 104 is at a full-intake stroke position) connecting intake duct 119 with combustion chamber 102 and thereby forming a chamber intake volume 123. Chamber intake volume 123 is defined by wall surfaces and end surfaces of combustion chamber 102, a surface of intake valve 106, a surface of exhaust valve 114, top surface 120 of piston 104, and walls of intake duct 119.

Figure 4:
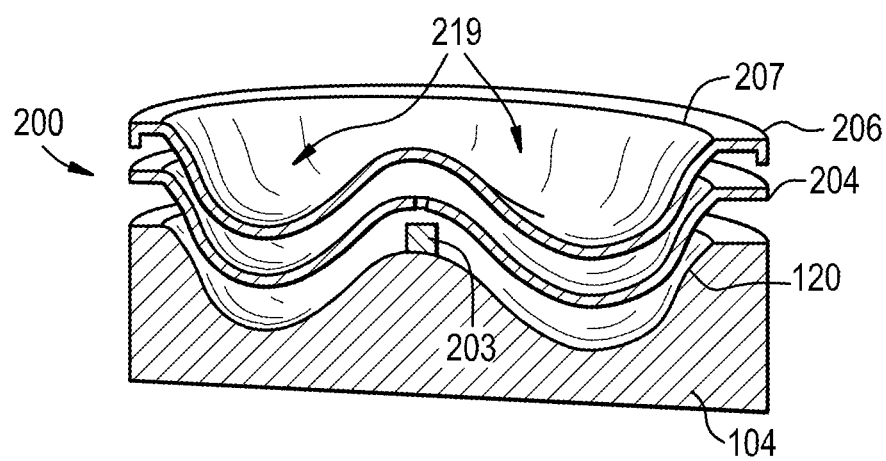
FIG. 4 is an exploded cross-sectional view of a composite thermal barrier along lines 1-1 on a piston from FIG. 1 according to an exemplary embodiment.
Figure 5:
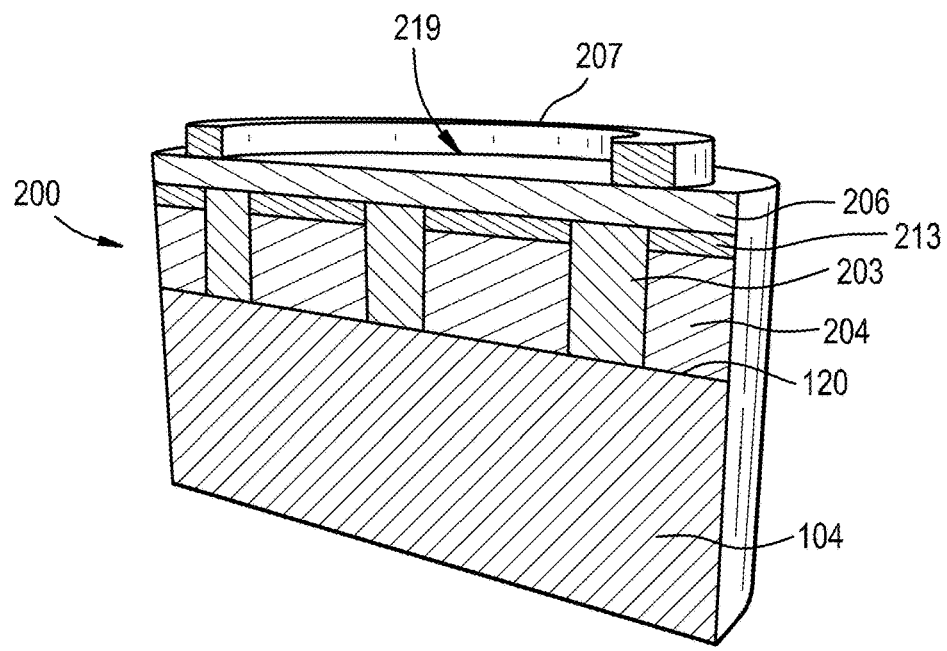
FIGS. 5-6 are cross-sectional views of a composite thermal barrier along lines 1-1 on a piston from FIG. 1 according to exemplary embodiments.
Figure 6:
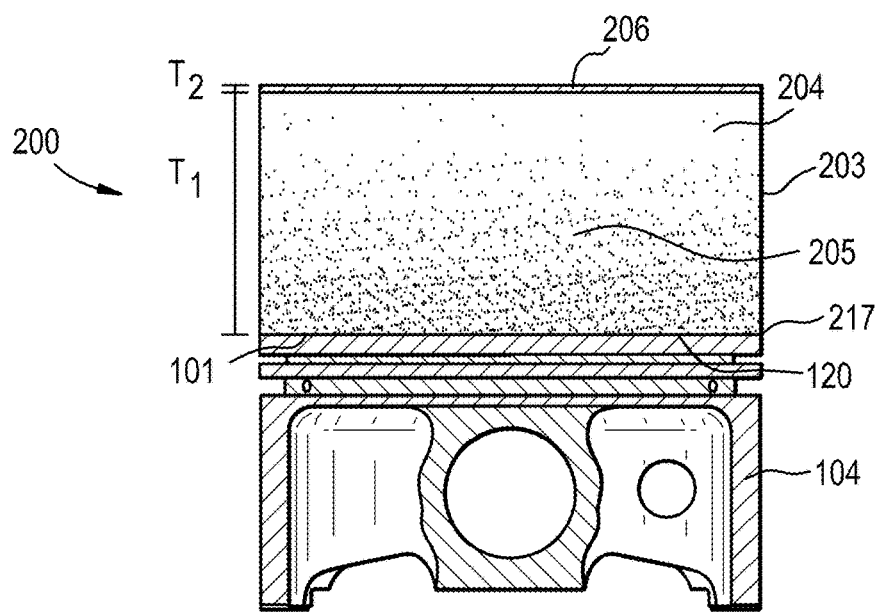
Figure 7:
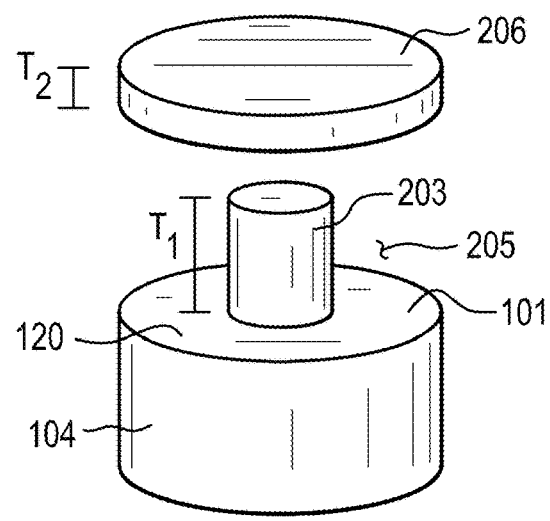
FIG. 7-8 are exploded perspective views of a support structure and metallic skin of a composite thermal barrier on a piston surface.
Figure 8:
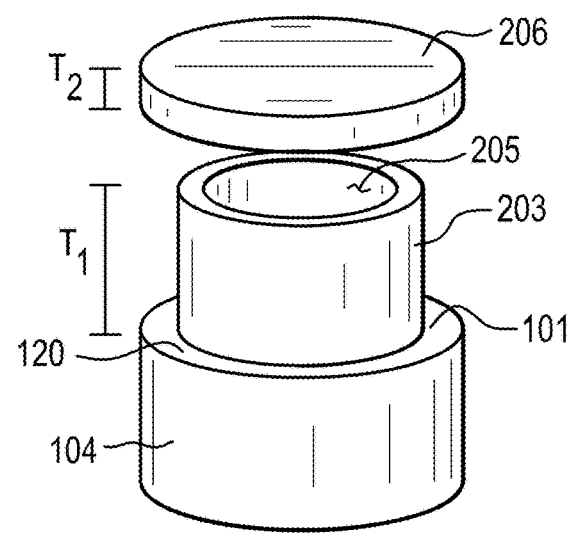
Figure 9:
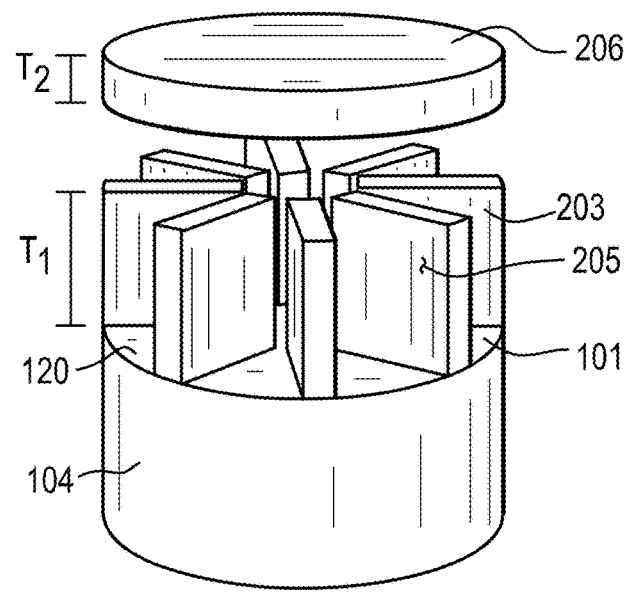
FIG. 9-11 are exploded perspective views of a plurality of support structures and metallic skin of a composite thermal barrier on a piston surface.
Figure 10:
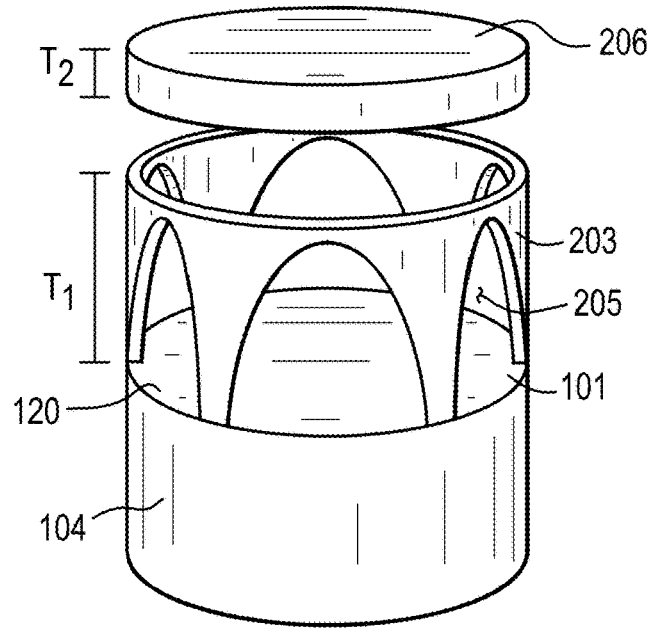
Figure 11:
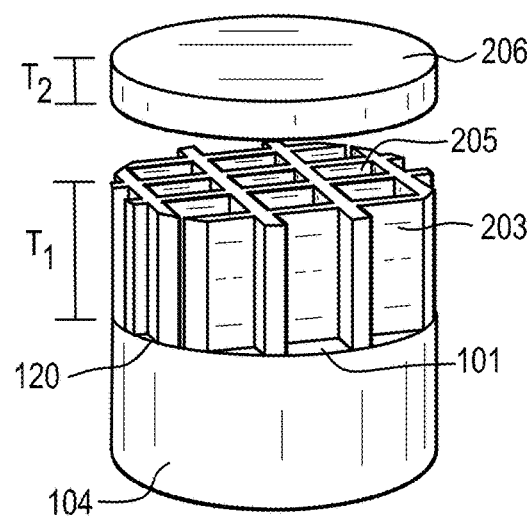

Composite thermal barrier 200 of the present disclosure may be on any metallic surface within engine 100. In an exemplary embodiment, composite thermal barrier 200 is on a metallic surface 101 within combustion chamber 102. Metallic surface 101 may be surfaces defining compression exhaust volume 121, surfaces defining chamber exhaust volume 122, or surfaces defining chamber intake volume 123. In one embodiment, surface 101 may not be wall surfaces of combustion chamber 102 contacted by piston 104. That is, composite thermal barrier 200 may be excluded from surfaces in chamber 102 subjected to mechanical friction from piston 104 or areas along the crevice quench that may wear or separate composite thermal barrier 200 from that surface. In another exemplary embodiment, metallic surface 101 is piston top surface 120, wall surfaces and end surfaces of combustion chamber 102, a surface of intake valve 106, a surface of exhaust valve 114, walls of exhaust duct 118, or walls of intake duct 119. In yet another exemplary embodiment, metallic surface 101 is only on metallic piston top surface 120 contiguous the combustion reaction within combustion chamber 102. FIG. 4 provides an example exploded cross-sectional view of piston 104 from FIG. 1 along lines 1-1 where piston top surface 120 includes a recessed volume 219 (or "bowl") with composite thermal barrier 200 thereon. FIG. 5 provides another example cross-sectional view of piston 104 from FIG. 1 along lines 1-1 where the recessed volume is formed by composite thermal barrier 200. FIG. 6 provides yet another example cross-sectional view of piston 104 from FIG. 1 along lines 1-1 including composite thermal barrier 200 thereon.

Composite thermal barrier 200 of the present disclosure includes a support structure 203, an insulation material 204, and a metallic skin 206. Composite thermal barrier 200 has a volume defined by a length, a width, and a thickness (i.e., thickness T1+thickness T2). Composite thermal barrier 200 volume may be in any shape including, but not limited to, rectangular, cubic, annular, hemispherical, or cylindrical. The shape of composite thermal barrier 200 volume may also conform to the rounded or non-uniform shapes of surface 101 to which it is connected. Composite thermal barrier 200 volume includes two distinct volumes: (i) a support volume including thickness T1; and (ii) a metallic skin volume including thickness T2. The support volume includes at least one support structure 203 and a void space 205 above surface 101. Support structure 203 is metallic. In other embodiments, support structure 203 is a material capable of supporting the metallic skin from temperatures and pressures within combustion chamber and has a thermal conductivity between about 1.0 W/m·K and about 12.0 W/m·K at 400° C. Support structure 203 is connected to metallic surface 101. In another embodiment, metallic support structure 203 is bonded to metallic surface 101 by metallic bonding, metal-to-metal bonding, or direct mechanical attachment. The connection between support structure 203 and metallic surface 101 is configured such that its strength resists the combustion temperatures and pressures within combustion chamber 102 during operation of engine 100. For example, resistance to spalling of metal 203 from surface 101 may last for ≥100,000 miles inside an operating engine. Metallic support structure 203 may be applied to surface 101 via 3-D printing, metallic plating, welding (arc, laser, plasma, or friction), brazing, plasma spraying, resistance welding, mechanical fastening, metallic plating, mechanical fastening or threading, or other conventional methods of creating metallic bonding, or metal-to-metal bonds. These methods are also applicable to applying metallic skin 206 adjacent to metallic support structure 203.

Figure 13:
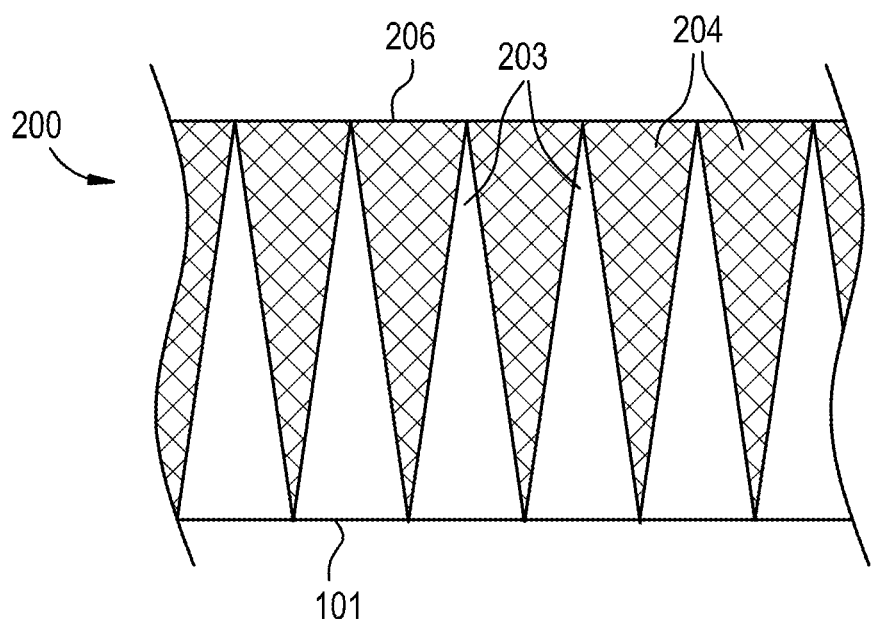

Support structure 203 of the present disclosure may have the shape of a pillar, a plane, a pyramid, an arch, or a honeycomb. Support structure 203 may have a variety of other shapes capable of connecting to metallic surface 101 and supporting metallic skin 206. FIGS. 7-11, 13, and 15 provide perspective views of support structure 203 on an example piston top surface 120 with metallic skin 206 detached therefrom. Of course, support structures of these embodiments may be provided on any surface 101. The structure of FIG. 7 support structure 203 may be described as a pillar. The structure of FIG. 8 support structure 203 may be described as annular and substantially concentric with the circumference of piston top surface 120. The structure of FIG. 9 support structure 203 may be described as a plurality of planes, which may be in any configuration capable of supporting metallic skin 206. The structure of FIG. 10 support structure 203 may be described as a plurality of arches. The structure of FIGS. 11, 15, 21, & 22 support structure 203 may be described as a honeycomb. The structure of support structure 203 may also be hexagonal, triangular, pentagonal, septagonal or rectangular in shape. FIG. 13 provides a close-up cross-sectional view of composite thermal barrier 200 wherein support structure 203 may be described as a pyramid. Of course other configurations (e.g., tapered, cut-outs, etc.) of support structure 203 are in accordance with the present disclosure.

The structure of support structure 203 is capable of supporting metallic skin 206. Void space 205 exists adjacent support structure 203 beneath metallic skin 206. FIGS. 6-11 illustrate void space 205 (or a plurality of void spaces 205) within and continuous support structure 203. In accordance with the present disclosure, insulation material is inserted into void space 205. The structure of support structure 203 may act as an anchor capable of interlocking insulation material 204 within void space 205. Referring to a particular embodiment in FIG. 6, support structure 203 may be circular or substantially concentric with the circumference of piston top surface 120. That is, support structure 203 and metallic skin 206 may form a "cap" around piston top surface 120. Said differently, support structure 203 and metallic skin 206 define a cylindrical void space 205 above piston top surface 120. In this embodiment, structure 203 may be connected to the piston top surface 102 by a locking ring 217 (shown in FIG. 6) that releasably locks with the circumference of piston 104.

The length and width of support structure 203 (including void space 205) can have any suitable lateral dimensions (e.g., from about 0.1 mm to about 100 cm), including equal dimensions. The length and width of support structure(s) 203 (or a plurality thereof) is sufficient to support metallic skin 206 and defines void space 205. Thickness T1 of support structure 203 may be from about 0.01 mm to about 10 mm, or from about 0.1 mm to about 5 mm, or from about 0.4 mm to about 2 mm, or even form about 0.5 mm to about 1 mm. In exemplary embodiments, thickness T1 is uniform across a plurality of support structures 203. Thickness T1 of support structure 203 may be measured from surface 101 to a termination point of support structure 203 away from surface 101. In an embodiment including a plurality of support structures 203, thickness T1 may also be measured from surface 101 to an average thickness of a plurality of support structures 203 away from surface 101. Surface 101 within combustion chamber 102 may be identified from support structure 203 by a lack of void space. That is, thickness T1 of support structure 203 may be distinct from a thickness of material comprising surface 101 by the presence of void space 205 (or insulation material 204 filled therein) within thickness T1. Alternatively, support structure 203 thickness T1 may be identified from surface 101 by a distinct interface of the connection caused by the application method.

In an embodiment where support structure 203 is metallic, the metal thereof may be an element or an alloy and may include metals and metal alloys commonly used in combustion chamber 102 manufacturing. The metal of metallic support structure 203 may include carbon steel, stainless steel, alloy aluminum, aluminum, nickel plated aluminum, cobalt, chrome, cobalt-chrome alloys, titanium, hastelloy, and combinations thereof for example. The metal of metallic support structure 203 may have the same coefficient of thermal expansion (CTE) as the material encompassing surface 101 (assuming similar operating temperature ranges) to minimize thermal expansion stresses and failures at their connection. In an exemplary embodiment, the CTE of the metal of metallic support structure 203 may be within 150% of the CTE as the material encompassing surface 101 (assuming similar operating temperature ranges).

Figure 12:
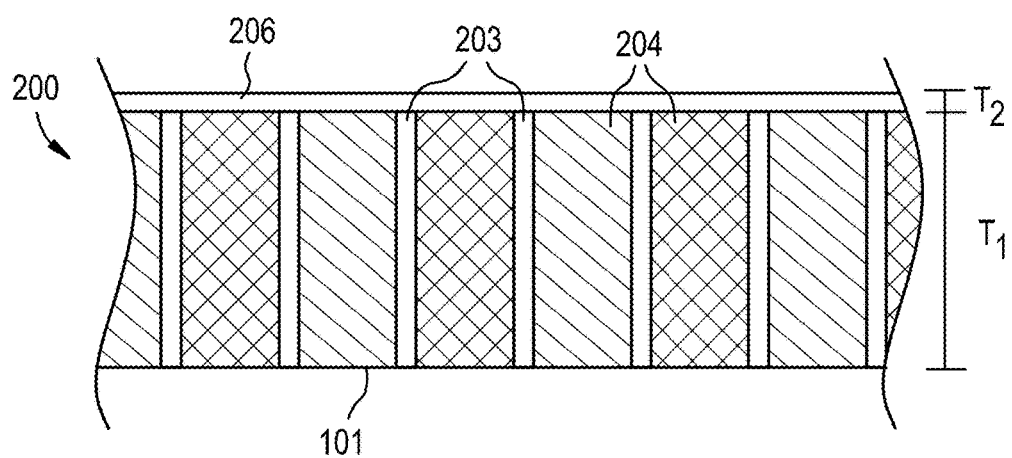
FIGS. 12-14 are close-up, cross-sectional views of a composite thermal barrier on a surface within a combustion chamber of an engine according to exemplary embodiments.

Composite thermal barrier 200 also includes metallic skin 206. Metallic skin 206 has a metallic skin volume defined by a length, a width, and a thickness T2. Metallic skin 206 is adjacent and supported by support structure 203 (which is connected to surface 101). In another embodiment, metallic skin 206 is connected to support structure 203. Metallic skin 206 may be connected to support structure by fusion welding, direct mechanical connecting, brazing, resistance welding, diffusion bonding, sintering, and other similar processes. These methods are also applicable to applying support structure 203 may be applied to surface 101. Metallic skin 206 further defines void space 205 in and around support structure 203, between metallic skin 205 and metallic surface 101. Referring to FIG. 12, metallic skin 206 is connected to support structure 203 at the termination point of support structure 203 away from surface 101. Metallic skin 206 is shown as solid along the termination points of support structures 203 in FIG. 12. In one embodiment, metallic skin 206 is substantially parallel with piston top surface 120. Metallic skin 206 is configured to enclose insulation material 204 within void space 205 such that amounts of insulation material 204 are not lost into combustion chamber 102 during operation of engine 100. Metallic skin 206 is shown as a solid surface in FIG. 5. Accordingly, insulation material 204 contained within void space 205 is enclosed between metallic skin 206 and metallic surface 101. Again, metallic skin 206 contains insulation material 204 within void space 205 around support structure 203 during operation of the engine 100 without losing insulation material 204 into combustion chamber 102.

Figure 15:
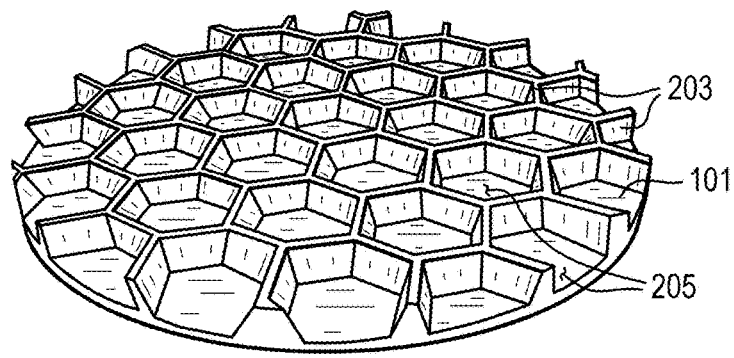
FIG. 15 is a perspective view of a plurality of support structures for a composite thermal barrier on a surface within a combustion chamber of an engine according to an exemplary embodiment.

In an alternative embodiment, support structure 203 may be formed on metallic skin 206 prior to applying support structure 203 to surface 101. As shown in FIG. 15, support structure(s) 203 may be formed on metallic skin 206 by sheet metal fabrication, superplastic forming, hydroforming, petrochemical etching, electrical discharge machining, mechanical milling, pressing and sintering, and other similar processes. Accordingly, insulation material 204 may be applied within void space(s) 205 before support 203 is connected to surface 101.

Metallic skin 206 may be a metallic element or a metal alloy and may include metals and metal alloys (e.gs., carbon steel, aluminum, Inconel) commonly used in combustion chamber 102 manufacturing. Metallic skin 206 may be the same metal as metallic support structure 203, or different. In one embodiment, metallic skin 206 is the same as the material encompassing surface 101. In an exemplary embodiment, the CTE of metallic skin 206 is the same as the material encompassing surface 101 (assuming similar operating temperature ranges) such that they expand and contract at relatively the same rate. Alternatively, the CTE of metallic skin 206 may be within 150% of the CTE of the material encompassing surface 101. The CTE of metallic skin 206 may also be within 150% of the CTE of metallic support structure 203 (assuming similar operating temperature ranges) so as to minimize thermal expansion stresses and failures at their connection.

Figure 14:
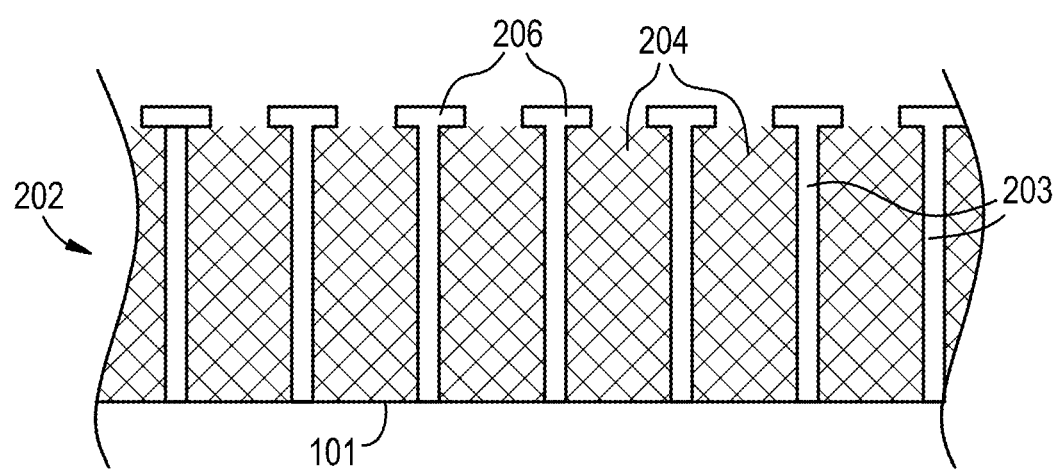

The length and width of metallic skin 206 can have any suitable lateral dimensions (e.g., from about 0.1 mm to about 100 cm), including equal dimensions. Metallic skin 206 lateral dimensions may extend across at least 50% of the length or the width of surface 101 including support structures 203 and void space 205, or even up to 100%. Accordingly, metallic skin 206 may include a plurality of discrete lengths and widths. FIG. 14 illustrates a cross-section of composite thermal barrier 200 accordingly to an exemplary embodiment with metallic skin 206 extending along less than the entire length of surface 101 including support structures 203. Metallic skin 206 may be configured to have discrete lengths and widths (thereby minimizing the amount of high thermally conductive material exposed to combustion chamber 102), but positioned on support structures 203 so as to contain or interlock insulation material 204 within the void space 205.

Thickness T2 of metallic skin 206 may be from about 0.001 mm to about 5 mm, or form about 0.001 mm to about 2 mm, or from about 0.1 mm to about 2 mm, or even from about 0.1 mm to about 1 mm. In exemplary embodiments, thickness T2 is uniform across the length and the width of surface 101 that includes support structures 203. As shown in FIGS. 6 & 12, thickness T2 of metallic skin 206 may be measured from the termination point of support structure 203 to a surface of metallic skin 206. Metallic skin 206 may be identified from support structure (including void space 205) by a lack of void space along thickness T2. That is, thickness T2 of metallic skin 206 may be distinct from thickness T1 of support structure 203 by the presence of void space 205 (or insulation material 204 filled therein) within thickness T1. Metallic skin 205 may have a variation tolerance along its combustion chamber exposed surface in compliance with tolerances required for engine 100, such as such as ≤1 mm, or ≤0.01 mm.

The length and width of composite thermal barrier 202 is defined by the length and width of metallic skin 206 including void space 205 there below. Void space 205 also has a smaller volume within the support volume (referred to herein as void space 205 volume). In one embodiment, composite thermal barrier 200 volume includes from about 1% to 95% metal (from support structure 203 and metallic skin 206). In alternative embodiments, composite thermal barrier 200 volume may be from about 20% to about 80% metal, or from about 35% to about 65% metal. Accordingly, composite thermal barrier 200 volume may be from 5% to about 99% void space 205, or about 20% to about 80% void space 205, or even from about 35% to about 65% void space 205. Void space 205 may extend across the entire thickness T1 of support volume. In alternative embodiments, void space 205 may extend across at least 50% of the thickness T1 of support volume. Void space 205 within the support volume may be a singular void space or a plurality of discrete and/or interconnected voids. A plurality of voids of void space 205 may have a diameter ranging from about 0.01 mm to about 4 mm, or from about 50 microns to about 5000 microns. The plurality of voids of void space 205 may have a median diameter D50 form about 0.02 mm to about 4 mm, or from about 200 to about 4000 microns. In an exemplary embodiment, the diameters of the plurality of voids of void space 205 are larger than particle sizes of insulation material 204 so insulation material 204 may be inserted into void space 205. Void space 205 of support volume may be a plurality of voids and extend at least 50% of the length of metallic skin 206, up to 100% of the length of the metallic skin 206.

Composite thermal barrier 200 also includes insulation material 204. Insulation material 204 is contained with void space 205 around support structure 203 and between surface 101 and metallic skin 206. In one embodiment, insulation material 204 is contained with a plurality of voids of void space 205 The presence of insulation material 204 within void space 205 (around support structure 203 and between surface 101 and metallic skin 206) inherently eliminates void space 205. Insulation material 204 may fill from 5% to 100% of void space 205. The volumetric ratio of metal in composite thermal barrier 200 to insulation material 204 in composite thermal barrier 200 may be from about 1:1 to about 1:5. In another embodiment, insulation material 204 (within void space 205) is ≥40% of composite thermal barrier 200 volume. As shown in FIG. 6, insulation material 204 (shown as the variably shaded area filling void space 205) may have a density gradient along the thickness T1 of support structure 203. The volumetric ratio, density, and location of insulation material 204 may allow for "tuning" of composite thermal barrier 202 to achieve a desired thermal conductivity.

In an exemplary embodiment, insulation material 204 is interlocked within void space 205 around support structure 203 by metallic skin 206 such that it does not escape, spall, or flake out into combustion chamber 102 during operation of engine 100. FIGS. 12-14 illustrate insulation material 204 (shown as hatched and cross-hatched areas) within the plurality of areas which used to be void space 205. That is, void space 205 is filled with insulation material 204. Insulation material 204 of the present disclosure may be air, argon, nitrogen, helium, a ceramic material, and combinations thereof. Insulation material 204 of the present disclosure may also be a vacuum pressure less than atmospheric pressure. As shown in FIG. 12, different insulation materials (shown as alternating cross-hatched and hatched areas) fill the plurality of voids (of void space 205). Insulation material 204 of the present disclosure may also be any material that is capable of flowing or being contained within void space 205 and with a thermal conductivity between about 0.1 W/m·K and about 12.0 W/m·K at 400° C., or about 0.1 W/m·K and about 8.0 W/m·K at 400° C., or even about 1.0 W/m·K and about 4.0 W/m·K at 400° C. Insulation material 204 is a composition having a low thermal conductivity within void space 205 between surface 101 and metallic skin 206 to increase the thermal resistivity of composite thermal barrier 200 such that more energy of combustion is available for performing work and powering engine 100.

In an embodiment where insulation material 204 includes ceramic material, the ceramic material may have a porosity from about 10% to about 90%, or from about 30% to about 70%. The pores of the ceramic material may include air, argon, nitrogen, helium, and combinations thereof. Alternatively, the pores of the ceramic material may have a vacuum pressure less than atmospheric pressure. Example ceramic materials include, but are not limited to, yttria stabilized zirconia (YSZ), zirconium dioxide, lanthanum zirconate, gadolinium zirconate, lanthanum magnesium hexaaluminate, gadolinium magnesium hexaaluminate, lanthanum-lithium hexaaluminate, barium zirconate, strontium zirconate, calcium zirconate, sodium zirconium phosphate, mullite, aluminum oxide, cerium oxide, and combinations thereof. The ceramic material of exemplary embodiments may be ceramic foam. The ceramic material of exemplary embodiments may also be formed from aluminates, zirconates, silicates, titanates, and combinations thereof.

Figure 19:
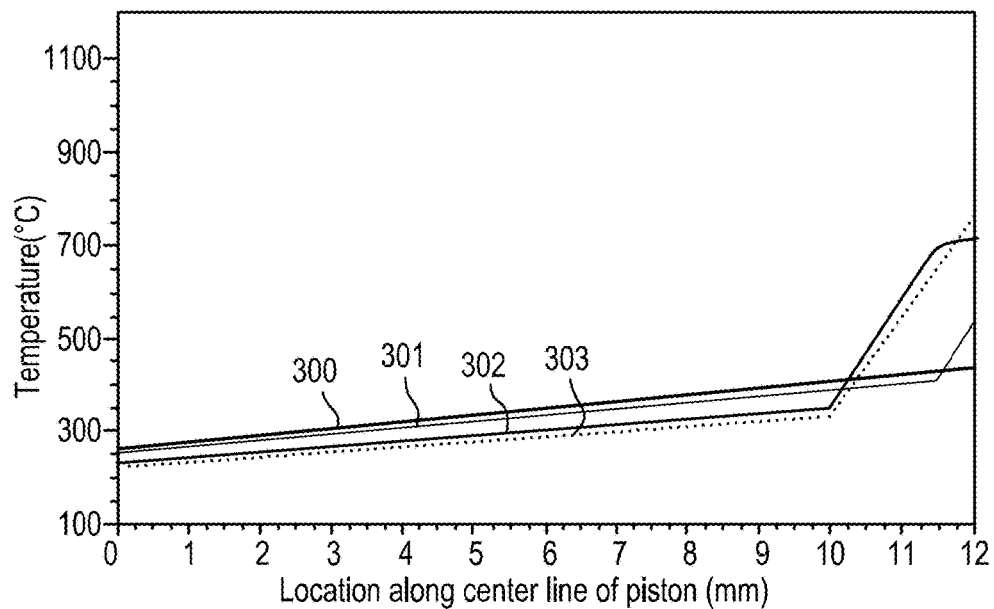
FIG. 19 is a plot of temperature (° C.) of a piston vs. location along the center line of the piston (mm) for different types of composite thermal barrier materials on the piston top surface (shown at 12 mm).

Again, composite thermal barrier 200 of the present disclosure includes support structure 203, metallic skin 206, and insulation material 204. Metallic skin 206 adjacent support structure 203 assists in containing insulation material 204 within void space 205 such that it does not spall or flake out into combustion chamber 102 during operation of engine 100. In an exemplary embodiment, composite thermal barrier 200 has a thermal conductivity of about 1 W/m·K to about 8 W/m·K at 400° C., or about 1 W/m·K to about 5 W/m·K at 400° C. Various embodiments of composite thermal barrier 200 on a surface within engine 100 are provided in FIGS. 4-6, 12-14, and 16-17. Of course, combinations of these embodiments and other embodiments are in accordance with this disclosure. FIG. 19 provides a plot of temperature (° C.) of a piston vs. location along the vertical center line of the piston (mm) for different types of composite thermal barrier materials on the piston top surface (shown at 12 mm). Line 300 models the heat transfer across the vertical height of a piston made from 4140 carbon steel. Line 301 models the heat transfer across the vertical height of a piston made from 4140 carbon steel with a 0.5 mm thick YSZ coating applied to piston top surface according to conventional methods. Line 302 models the heat transfer across the vertical height of a piston made from 4140 carbon steel with a 1.5 mm thick, 10 vol. % Inconel 718 alloy (with 90 vol. % air) and a 0.5 mm thick, solid Inconel 718 alloy metallic skin thereon according to the present disclosure. Line 303 models the heat transfer across the vertical height of a piston made from 4140 carbon steel with a 2 mm thick YSZ coating applied to piston top surface according to conventional methods. Line 302 provides that composite thermal barrier 200 of the present disclosure has comparable heat resistivity to conventional thermal barriers (e.g., lines 301 and 303) but provides support structure 203 and metallic skin 206 to keep insulation material 204 from spalling into engine 100 during its operation.

Figure 16:
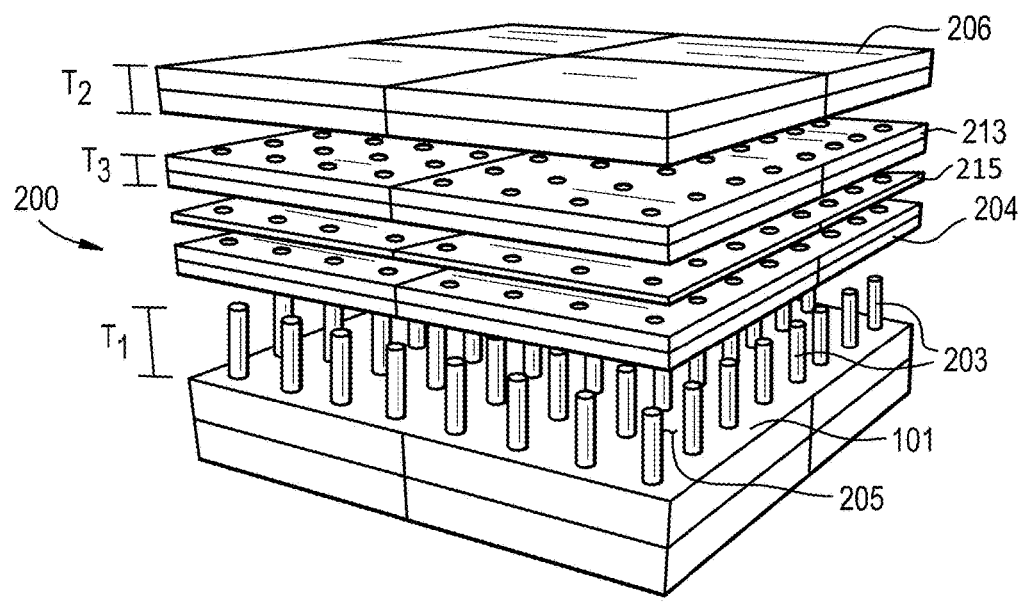
FIG. 16 is a perspective, exploded view of a composite thermal barrier on a surface within a combustion chamber of an engine according to an exemplary embodiment.
Figure 20:
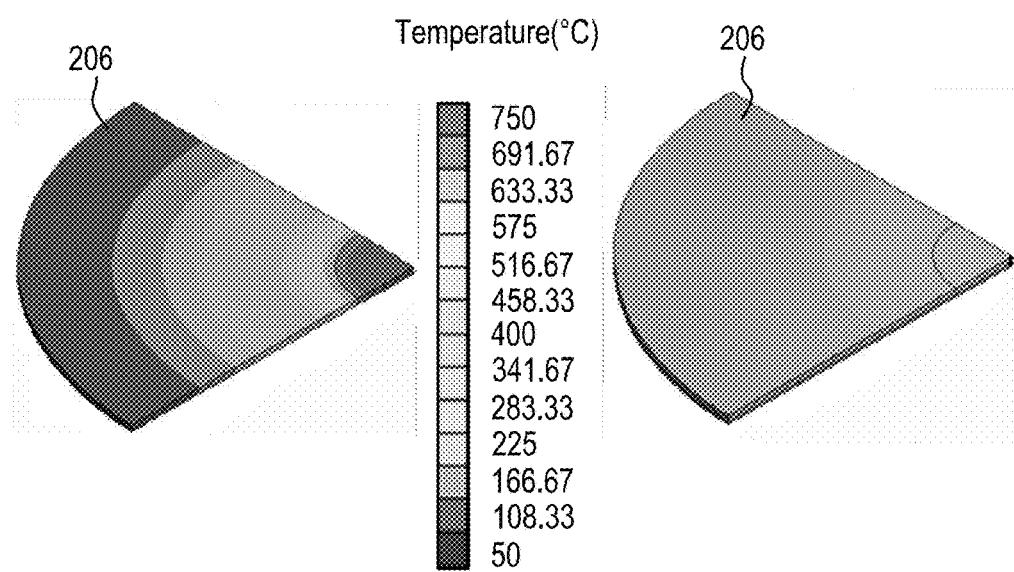
FIG. 20 is a transient thermal analysis comparison of the metallic skin of composite thermal barrier with and without a heat distribution layer.

As shown in FIGS. 5 & 16, composite thermal barrier 200 may also include a heat distribution layer 213. Heat distribution layer 213 may be between support volume and metallic skin 206 volume, and may be bonded to metallic skin 206. Heat distribution layer 213 has a volume defined by a length, a width, and a thickness T3. Thickness T3 may be part of thickness T1 or thickness T2. Thickness T3 may be from about 0.01 mm to about 3 mm. The lateral dimensions of heat distribution layer 213 may be any dimensions (including discrete dimensions) below metallic skin 206. Heat distribution layer 213 is configured to conduct heat from "hot spots" on metallic skin 206 and evenly distribute the heat across metallic skin 206. That is, heat distribution layer 213 reduces hot spots on metallic skin 206 which can cause thermo mechanical fatigue, especially on piston top surface 120. Heat distribution layer 213 may be formed from metals including copper, gold, aluminum, brass, or other elements or compounds capable of thermally conducting heat from metallic skin 206 to redistribute heat evenly back to metallic skin 206. Heat distribution layer 213 may have a thermal conductivity ≥85 W/m·K, or ≥170 W/m·K, or even ≥340 W/m·K. In exemplary embodiments, heat distribution layer 213 is formed so as not to increase the thermal conductivity of the composite thermal barrier 200. FIG. 20 provides two cross-sectional transient thermal analysis views of metallic skin 206. Both of metallic skins 206 in FIG. 20 are modeled with a thickness of 0.5 mm as Inconel 718 alloy using the transient thermal model. The left view of metallic skin 206 in FIG. 20 is modeled without an underlying heat distribution layer 213. The right view of metallic skin 206 in FIG. 20 is modeled with an underlying copper heat distribution layer 213 with T3=0.2 mm.

As shown in FIG. 16, composite thermal barrier 200 may also include a heat reflective layer 215 below heat distribution layer 213 and above surface 101. Heat reflective layer 215 is configured to minimize the transmission of infrared energy from metallic skin 206 to surface 101. Heat reflective layer 215 may take the form of one or more thin sheets which possess low infrared emissivity at high temperatures, preferably less than 0.3. Possible materials for heat reflective layer 215 include, but are not limited to, stainless steel, copper alloys, nickel alloys, and gold. Heat reflective layer 215 may also be coated or plated with elements, alloys or compounds of low emissivity to enhance its performance. Possible coating materials would include but are not limited to tantalum or platinum. Intermediate layers within heat reflective layer 215 may exist to improve adhesion of the coating or to reduce inter diffusion between the heat reflective layer 215 and the coating.

Figure 17:
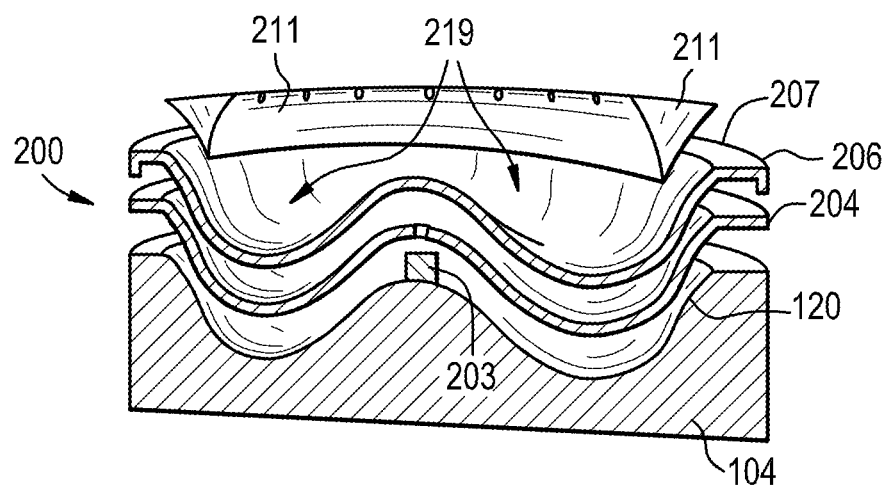
FIG. 17 is the exploded cross-sectional view of a composite thermal barrier from FIG. 4 including an annular rim according to an exemplary embodiment.

Referring back to FIG. 4, an example exploded cross-sectional view of piston 104 from FIG. 1 along lines 1-1 is provided. Therein, piston top surface 120 includes recessed volume 219 (or "bowl") with composite thermal barrier 200 on s thereon. Referring back to FIG. 5, another example cross-sectional view of piston 104 from FIG. 1 along lines 1-1 is provided where recessed volume 219 is formed by composite thermal barrier 200 (or metallic skin 206). Recessed volume 219 includes an edge 207 along composite thermal barrier 200 that is contiguous the combustion reaction within combustion chamber 102. Edge 207 of recessed volume 219, thus, may be particularly susceptible to thermo mechanical fatigue and cracking (from rapid heating and cooling) when exposed to the cyclic combustion chamber 102 temperatures and pressures. Thus, as shown in FIG. 17, composite thermal barrier 200 may also include an annular rim 211 to protect edge 207 and improve its thermo mechanical fatigue resistance.

Figure 18:
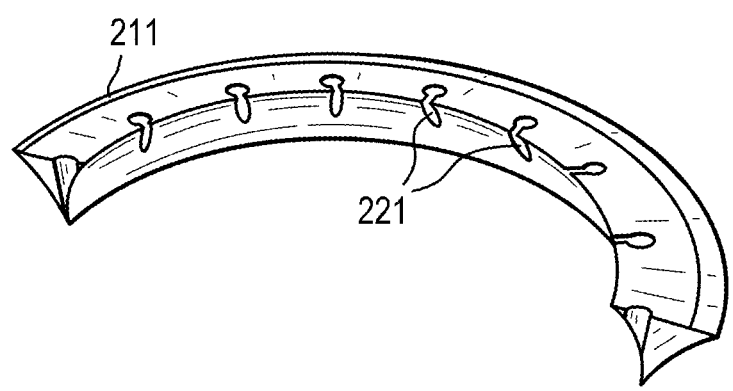
FIG. 18 is a perspective, cross-sectional view of the annular rim from FIG. 16 according to an exemplary embodiment.

Annular rim 211 may connect or bond to metallic skin 206 at edge 207 of recessed volume 219. Annular rim is configured to improve thermo mechanical fatigue resistance at edge 207 by separating the edge from the combustion reaction. Annular rim has a thickness from about 0.1 mm to about 2 mm. Annular rim 211 has lateral dimensions and is configured to fit within combustion chamber 102 above piston 104 during operation of engine 100. Annular rim 211 may be formed from the same material as metallic skin 206. In alternative embodiments, annular rim 211 may be formed from a material that is less susceptible to thermal cracking at the location of edge 207. FIG. 18 provides a perspective view of annular rim 211. Annular rim may have radial slots 221 at locations around its circumference to reduce the circumferential mechanical constraint around annular rim 211 so as to reduce the propagation of cracks on rim 211 during cyclic operation (and heating and cooling) of engine 100.

The present disclosure also includes methods of applying composite thermal barrier 200 to metallic surface 101 within combustion chamber 102 of engine 100. The method includes preparing metallic surface 101 for application of support structure 203. Preparing metallic surface 101 may include roughening, chemical etching, drilling, cleaning, or other processes of readying surface 101 for application of support structure 203 thereon. It is envisioned that the method of preparation of surface 101 will likely depend on the method of applying support structure 203 on surface 101.

The method of applying composite thermal barrier 200 to metallic surface 101 includes applying support structure 203 to surface 101. Applying support structure 203 to surface 101 may be accomplished with 3-D printing, metallic plating, mechanical fastening or threading, fusion welding, brazing, resistance welding, diffusion bonding, sintering, and other conventional methods of creating metallic bonding, or metal-to-metal bonds. Methods of applying support structure 203 to surface 101 include the formation of void space 205 around support structure 203.

The method of applying composite thermal barrier 200 to metallic surface 101 also includes forming metallic skin 206 adjacent to support structure 203. Methods of forming metallic skin 206 adjacent to support structure 203 may include 3-D printing, metallic plating, dip coating, deposition, fusion welding, brazing, resistance welding, diffusion bonding, sintering, and other conventional methods of forming a uniform metallic skin on the periphery of support structure 203.

Alternative methods include forming support structure 203 on metallic skin 206 prior to applying support structure 203 to surface 101. In this embodiment, support structure 203 may be formed on metallic skin 206 by sheet metal fabrication, superplastic forming, hydroforming, petrochemical etching, electrical discharge machining, mechanical milling, pressing and sintering, and other similar processes. Subsequently, support structure 203 is applied or connected to surface 101 by above mentioned methods.

The method of applying composite thermal barrier 200 to metallic surface 101 also includes inserting insulation material 204 within void space 205 between metallic surface 101 and metallic skin 206. Methods of inserting insulation material 204 within void space 205 include pressure application, injection, pressing, impregnating, and other conventional methods of inserting a solid or gas insulator in void space. It is envisioned that inserting insulation material 204 within void space 205 may be accomplished while applying support structure 203 or forming metallic skin 206. That is, void space 205 created when applying support structure 203 or forming metallic skin 206 may inherently include an insulation material (e.g., air, vacuum, etc.) without a separate step of inserting insulation material 204 in void space 205.

EXAMPLES

The present disclosure will be further clarified with reference to the following examples. The following examples should be construed as illustrative and in no way limiting as to the present disclosure.

Modeling Example 1

The effective thermal conductivity of theoretical composite thermal barriers where modeled using the following equation:

$$\Lambda = \sum_{i=1}^{n} \phi_i k_i$$

where $\Lambda$ is effective thermal conductivity of composite thermal barrier 200 in W/m·K, where $k_i$ is the thermal conductivity of a component (e.g., support structure 203) in W/m·K, and wherein $\phi_i$ is volume fraction of a component.

Using the above referenced equation, the volume fractions of a metal component (support structure 203 and metallic skin 206) and an insulation component (insulation material 204) where varied for Examples 1-13 to model a composite thermal barrier (CTB). Tables 1a and 1b provide the relative fractions and materials for each of Examples 1-13 and comparative examples (CE) 1-4. Tables 1a and 1b also provide the modeled thermal properties of including the CTB thermal conductivity, CTB effective density, CTB effective heat capacity, and CTB thermal diffusivity. Also shown is the thickness of the CTB modeled to effectively function when exposed to a combustion environment at 2000° C. when the piston surface is at 400° C., and maximum temperature increase at thickness depth of 250° C.

TABLE 1a

Modeled Composite Thermal Barriers (CTB)

| | | Examples | | | | | | | |
|---|---|---|---|---|---|---|---|---|---|
| | | 1 | 2 | 3 | 4 | 5 | 6 | 7 | 8 |
| CTB | Metal | 316 SS | 316 SS | 316 SS | 316 SS | 316 SS | 316 SS | 316 SS | 316 SS |
| | Ceramic | YSZ | YSZ | YSZ | YSZ | YSZ | YSZ | YSZ | YSZ |
| | Gas within void space or ceramic porosity | Air | Air | Air | Air | Air | Air | Air | Air |
| CTB Metal Volume Fraction | | 0.1 | 0.2 | 0.3 | 0.4 | 0.5 | 0.6 | 0.7 | 0.8 |
| CTB Ceramic Volume Fraction | | 0.9 | 0.8 | 0.7 | 0.6 | 0.5 | 0.4 | 0.3 | 0.2 |
| CTB Gas Volume Fraction | | 0.0 | 0.0 | 0.0 | 0.0 | 0.0 | 0.0 | 0.0 | 0.0 |
| Ceramic Porosity | | 0.0 | 0.0 | 0.0 | 0.0 | 0.0 | 0.0 | 0.0 | 0.0 |
| CTB Thickness (mm) (T1 + T2) | | 0.6 | 0.7 | 0.8 | 0.9 | 0.9 | 1.0 | 1.1 | 1.1 |
| CTB Effective Thermal Conductivity (W/m·K) | | 3.3 | 4.5 | 5.7 | 6.9 | 8.1 | 9.2 | 10.4 | 11.6 |
| CTB Effective Density (km/m$^3$) | | 6185 | 6370 | 6555 | 6740 | 6925 | 7110 | 7295 | 7480 |
| CTB Effective Heat Capacity (J/kg/K) | | 625 | 602 | 580 | 560 | 540 | 521 | 504 | 487 |
| CTB Effective Thermal Diffusivity (m$^2$/s) | | 8.6E-7 | 1.2E-6 | 1.5E-6 | 1.8E-6 | 2.2E-6 | 2.5E-6 | 2.8E-6 | 3.2E-6 |

TABLE 1b

Modeled CTBs Cont'd with 4 Comparative Examples (CE)

| | Examples | | | | | | | | |
|---|---|---|---|---|---|---|---|---|---|
| | 9 | 10 | 11 | 12 | 13 | CE 1 | CE 2 | CE 3 | CE 4 |
| CTB Metal | 316 SS | 316 SS | 316 SS | 316 SS | 316 SS | Carbon steel | Al | 316 SS | 316 SS |
| Ceramic | YSZ | YSZ | YSZ | YSZ | YSZ | YSZ | YSZ | YSZ | YSZ |
| Gas | Air | Air | Air | Air | Air | Air | Air | Air | Air |
| CTB Metal Volume Fraction | 0.2 | 0.2 | 0.2 | 0.4 | 0.4 | 1.0 | 1.0 | 1.0 | 0.0 |
| CTB Ceramic Volume Fraction | 0.6 | 0.4 | 0.0 | 0.4 | 0.0 | 0.0 | 0.0 | 0.0 | 1.0 |
| CTB Gas Volume Fraction | 0.2 | 0.4 | 0.8 | 0.2 | 0.6 | 0.0 | 0.0 | 0.0 | 0.0 |
| Ceramic Porosity | 0.25 | 0.50 | 0.00 | 0.33 | 0.00 | 0.00 | 0.00 | 0.00 | 0.00 |
| CTB Thickness (mm) (T1 + T2) | 0.7 | 0.7 | 1.6 | 0.9 | 1.4 | 2.1 | 5.3 | 1.3 | 0.5 |
| CTB Effective Thermal Conductivity (W/m·K) | 3.6 | 3.1 | 4.5 | 6.0 | 6.9 | 38.0 | 167.0 | 14.0 | 2.1 |
| CTB Effective Density (km/m$^3$) | 5170 | 3970 | 1570 | 5540 | 3140 | 7850 | 2700 | 7850 | 6000 |
| CTB Effective Heat Capacity (J/kg/K) | 591 | 573 | 456 | 540 | 456 | 456 | 896 | 456 | 650 |
| CTB Effective Thermal Diffusivity (m$^2$/s) | 1.2E-6 | 1.4E-6 | 6.3E-6 | 2.0E-6 | 4.8E-6 | 1.1E-5 | 6.9E-5 | 3.9E-6 | 5.4E-7 |

The 14 modeled composite thermal barriers (CTB) in Table 1a and Table 1b provide that a CTB thickness from about 0.5 mm to about 2 mm on a steel piston have an effective thermal conductivity of the modeled examples of the present disclosure are from about 3.0 W/m·K to about 12 W/m·K. These modeled example CTBs also have an effective thermal diffusivity from about 8.0E-7 to about 7.0E-6. Comparative example 4 provides an example prior art CTB where the insulation material (YSZ) is not held within a support structure 203 and metallic skin 206 according to the present disclosure.

Figure 21:
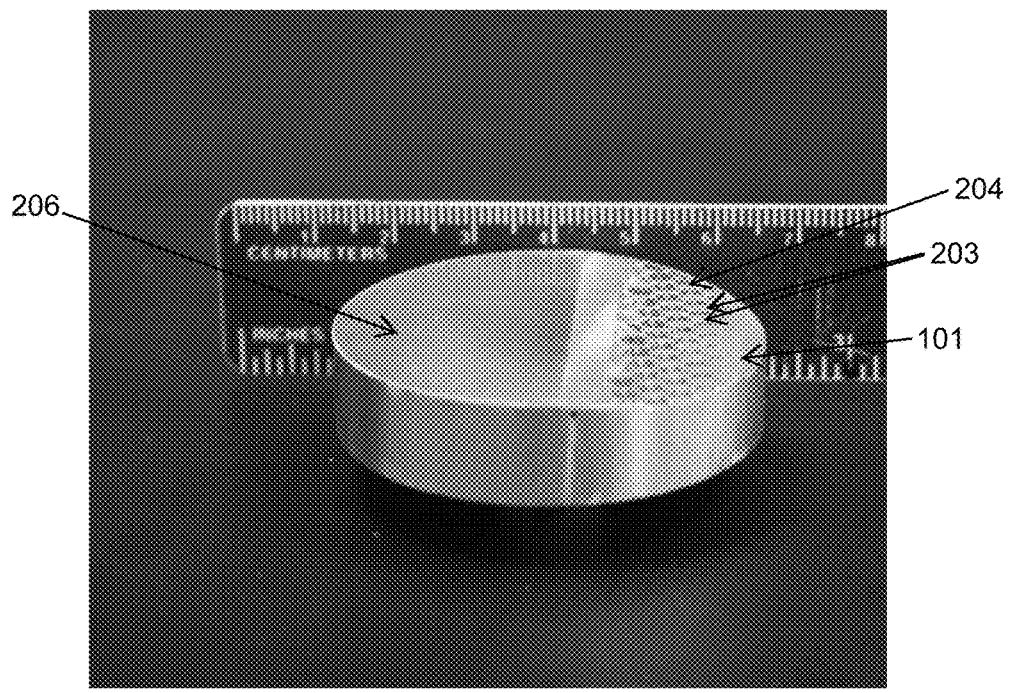
FIG. 21 is a perspective view photograph of a composite thermal barrier with a metallic skin (partially removed on the right side) on a coupon simulating a surface within a combustion chamber of an engine according to an exemplary embodiment.
Figure 22:
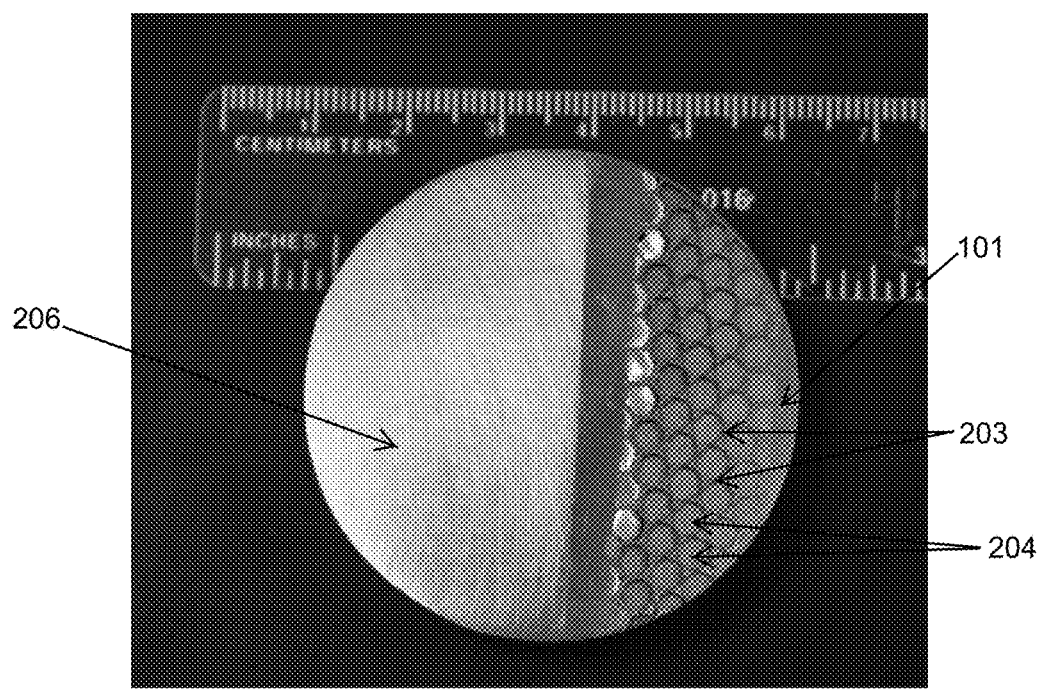
FIG. 22 is a top view photograph of a composite thermal barrier with a metallic skin (partially removed on the right side) on a coupon simulating a surface within a combustion chamber of an engine according to an exemplary embodiment.

FIGS. 21 & 22 provide photographs of an example CTB 200 on an example surface 101. A portion of metallic skin 206 is removed on the right side of the coupon of CTB 200 to show the 1.5 mm thick metallic support structure 203 and insulation material 204 and 0.5 mm thick metallic skin 206.

Example 2

Five composite thermal barriers (Examples 2-6) in accordance with the present disclosure were prepared on direct metal laser sintered coupons (simulating an engine internal surface) and tested under severe thermal cycling (up to 50 cycles) to demonstrate thermal resistivity and spalling resistance.

The first composite thermal barrier was prepared on a 50 mm square by 12 mm thick F75 cobalt-chrome (Co—Cr) block coupon. Support structures in the shape of a plurality of F75 Co—Cr 1.15 mm diameter posts (each 1.5 mm tall on the coupon flat surface) each equally spaced apart in a triangular array were direct metal laser sintered onto the coupon. The coupon also included a raised edge along its perimeter 1.15 mm wide and 1.5 mm tall. The support structures included 90% open frontal area (OFA) across its thickness (i.e., between the surface of the coupon and the termination ends of the plurality of posts). A 100 micron bond coat of nickel chromium aluminum yttrium (NiCrAlY) was applied to the surface of the coupon around the plurality of posts. YSZ was plasma sprayed over the NiCrAlY to fill the void space (defined by the OFA and the thickness of the plurality of the posts) around the metallic supports. Excess YSZ extending above the termination ends of the plurality of posts was diamond ground so the YSZ was flush with the termination ends of the plurality of posts. The YSZ had porosity of about ≤1%.

The first composite thermal barrier coupon was tested by repeatedly heating and air cooling in increments of 10 cycles. The thermal barrier was then inspected for signs of damage or spalling of the insulation material from the void space around the supports. To record temperature and heat conduction across the thermal barrier during testing, a needle thermocouple was provided through a small hole in the bottom of the coupon to about 0.5 mm below the surface on which the thermal barrier was connected. During heating in each cycle, the thermal barrier coupon was direct flame heated for 30 seconds with a 2-stage Bethlehem Champion lampworking torch (using the inner burner ring only). The torch face was oriented normal to and 4 inches from the top of the thermal barrier. The torch was supplied with about 6 standard cubic feet per minute (SCFM) of natural gas and about 15 SCFM of pure oxygen gas. After 30 seconds of heating, the thermal barrier was cooled using a Vortec® Model 631 Cold Air Gun supplied with about 20 SCFM of air at about 12° C. The air gun was oriented normal to and 4 inches from the top of the thermal barrier. During each cycle, the thermal barrier coupon was cooled until the thermocouple read about 100° C. (i.e., about 3.5 minutes).

The heating and cooling described above was considered a single cycle. After 10 cycles of each sequential heating and cooling operation, the first thermal barrier coupon was inspected under a microscope at about 10× magnification for visible signs of spalling, delamination of the thermal barrier from the coupon surface, and/or cracks in the support structures or the insulation material (YSZ). The above described testing is considered severe thermal cycling and was conducted to simulate the most extreme conditions that a thermal barrier would experience in a combustion engine. Of course, in some engines a thermal barrier would not experience such extreme temperature swings and may exhibit improved performance over the results observed.

The above described testing of the first composite thermal barrier was repeated for 11 cycles. After the initial cycle, small visible cracks in the YSZ material were present between a majority of the plurality of posts. During the subsequent 10 cycles, the cracks in the YSZ material continued to propagate between all of the posts. Testing was stopped after 11 cycles despite no delamination or spalling of YSZ from the metallic support structures. The average peak temperature recorded by the thermocouple (at 0.5 mm below the surface on which the thermal barrier was connected) was about 467° C.

Example 3

The second composite thermal barrier was prepared on a 50 mm square by 12 mm thick F75 Co—Cr block coupon. Support structures in the shape of a plurality of F75 Co—Cr interconnected uniform walls forming an array of hexagonal cells, each wall 1.15 mm wide and 1.5 mm tall spaced apart in a hexagonal array were direct metal laser sintered onto the coupon (similar to that pictured in FIG. 15). The coupon also included a raised edge along its perimeter 1.15 mm wide and 1.5 mm tall. The support structures included 90% OFA across its thickness (i.e., between the surface of the coupon and the termination ends of the plurality of walls). A 100 micron bond coat of NiCrAlY was applied to the surface of the coupon around the plurality of walls (i.e., inside each hexagonal cell). YSZ was plasma sprayed over the NiCrAlY to fill the void space (defined by the OFA and the thickness of the plurality of the walls) around the metallic supports. Excess YSZ extending above the termination ends of the plurality of walls was diamond ground so the YSZ was flush with the termination ends of the plurality of posts. The YSZ had porosity of about ≤1%.

The testing described in Example 2 above was conducted on the second thermal barrier for 50 cycles. No visible signs of failure or delamination were observed. Testing was stopped after 50 cycles as it was determined the thermal barrier had provided superior resistance to spalling via thermal cycling. The average peak temperature recorded by the thermocouple (at 0.5 mm below the surface on which the thermal barrier was connected) was about 430° C. In was unexpected that the configuration of the metallic support structures of the second thermal barrier (titled hexagons) and the discrete portions of YSZ therebetween resulted in less thermal related cracking of the YSZ from thermal cycling.

Example 4

The third composite thermal barrier was prepared on a 50 mm square by 12 mm thick F75 Co—Cr block coupon. Support structures in the shape of a plurality of F75 Co—Cr 1.15 mm diameter posts (each 1.5 mm tall on the coupon flat surface) each equally spaced apart in a triangular array were direct metal laser sintered onto the coupon. The coupon also included a raised edge along its perimeter 1.15 mm wide and 1.5 mm tall. The metallic supports included 90% OFA across its thickness (i.e., between the surface of the coupon and the termination ends of the plurality of posts). A 100 micron bond coat of NiCrAlY was applied to the surface of the coupon around the plurality of posts. YSZ was plasma sprayed over the NiCrAlY to fill the void space (defined by the OFA and the thickness of the plurality of posts) around the metallic support structures. Excess YSZ extending above the termination ends of the plurality of posts was diamond ground so the YSZ was flush with the termination ends of the plurality of posts. The YSZ had porosity of about ≤1%. Finally, a 0.5 mm thick Ni—Al alloy (95% nickel, 5% aluminum) continuous skin was plasma sprayed over the top of the YSZ in contact with the termination ends of the plurality of posts.

The testing described in Example 2 above was conducted on the third thermal barrier for 50 cycles. After less than about 10 cycles, the skin was visibly cracked at the center of the coupon. After about 35 cycles, the skin was severely cracked and began separating or delaminating from the coupon at the center thereof. Testing was stopped after 50 cycles and no cracking or delamination of the YSZ insulation material was observed. The average peak temperature recorded by the thermocouple (at 0.5 mm below the surface on which the thermal barrier was connected) was about 343° C. These results were unexpected compared to the first thermal barrier because the barrier provided increased thermal resistivity as shown by the lower peak temperature below the barrier. Also, the presence of the metallic skin in the thermal barrier resulted in less visible thermal related cracking of the YSZ from thermal cycling.

Example 5

The fourth composite thermal barrier was prepared on a 50 mm diameter by 12 mm thick F75 Co—Cr cylindrical coupon. Support structures in the shape of a plurality of F75 Co—Cr 1.15 mm diameter posts (each 1.5 mm tall on the coupon flat surface) each equally spaced apart in a triangular array were direct metal laser sintered onto the coupon. The coupon also included a raised edge along its perimeter 1.15 mm wide and 1.5 mm tall. The metallic support structures included 90% OFA across its thickness. No bond coat or YSZ was included. Instead the void space was filled with air as the insulation material. A 0.5 mm thick Co—Cr continuous skin was direct metal laser sintered over the top of the metallic supports in contact with the termination ends of the plurality of posts.

The testing described in Example 2 above was conducted on the fourth thermal barrier for 50 cycles. After about 30 cycles, the skin began to visibly crack. Testing was stopped after 50 cycles with no severe cracking or delamination of the skin. The average peak temperature recorded by the thermocouple (at 0.5 mm below the surface on which the thermal barrier was connected) was about 528° C.

Example 6

The fifth composite thermal barrier was prepared on a 50 mm diameter by 12 mm thick F75 Co—Cr cylindrical coupon. Support structures in the shape of a plurality of F75 Co—Cr 1.15 mm diameter posts (each 1.5 mm tall on the coupon flat surface) each equally spaced apart in a triangular array were direct metal laser sintered onto the coupon. The coupon also included a raised edge along its perimeter 1.15 mm wide and 1.5 mm tall. The metallic support structures included 75% OFA across its thickness. No bond coat or YSZ was included. Instead the void space was filled with air as the insulation material. A 0.5 mm thick Co—Cr alloy continuous skin was direct metal laser sintered over the top of the metallic supports in contact with the termination ends of the plurality of posts.

The testing described in Example 2 above was conducted on the fourth thermal barrier for 70 cycles. No visible signs of cracking were observed after 50 heating and cooling cycles. After about 70 cycles, the skin began to visibly crack at the center of the coupon. Testing was stopped after 70 cycles with no severe cracking or delamination of the skin. The average peak temperature recorded by the thermocouple (at 0.5 mm below the surface on which the thermal barrier was connected) was about 570° C.

Prophetic Example 7

In this prophetic example, the five composite thermal barriers (from Examples 2-6 described above) would be subjected to pressure, pulsation, and/or vibration testing to simulate exposure of the composite thermal barrier to the combustion reaction and movement of fluids inside the combustion chamber. Specifically, a hydro pulse system could deliver from about 1 psi to about 5000 psi pressurized hydraulic fluid (or similar fluid chosen to mimic combustion reactants) at about 30 Hertz (or another frequency chosen to mimic an internal combustion engine) normal to the face of the five composite thermal barriers (from Examples 2-6 described above). It is expected that these five composite thermal barriers would behave similar to surfaces within combustion engines that do not include thermal barriers. That is, these five composite thermal barriers would resist metal fatigue and would effectively limit spalling or delamination of the insulation material into the engine. The inventors expect that the second composite thermal barrier of Example 3 would spall a small portion of the YSZ material from the hexagonal cells into the engine during this prophetic test. However, the inventors expect that it would not be a catastrophic failure in which all of the YSZ material would spall into the engine simultaneously and damage crucial internal engine parts. The inventors also expect that the third, fourth, and fifth composite thermal barriers (of Examples 4-6) which include a skin would even more effectively resist this testing and limit spalling or delamination of material into the engine.

Comparative Example 1

Two conventional thermal barriers were prepared on coupons (simulating an engine internal surface) and tested under severe thermal cycling (up to 50 cycles) to demonstrate the superior thermal resistivity and spalling resistance of the composite thermal barriers of the present disclosure (and demonstrated in Example 2 above).

The first comparative thermal barrier was prepared on a 50 mm diameter by 12 mm thick F75 Co—Cr cylindrical coupon. No metallic supports were applied thereto. A 100 micron bond coat of NiCrAlY was applied to the entire surface of the coupon. A YSZ layer was plasma sprayed over the NiCrAlY and diamond ground down to uniform 2.0 mm layer thereon. No metallic skin was applied.

The testing described in Example 2 above was conducted on the first comparative thermal barrier for 11 cycles. After the initial heating-cooling cycle, small visible cracks in the YSZ material were visible. After the subsequent 2 cycles, the cracks in the YSZ material continued to propagate and the YSZ began to delaminate from the surface of the coupon. Testing was stopped after 11 cycles as the YSZ almost completely delaminated from the coupon and it was determined that the thermal barrier had failed. The average peak temperature recorded by the thermocouple (at 0.5 mm below the surface on which the YSZ was connected) was about 369° C.

Comparative Example 2

The second comparative thermal barrier was prepared on a 50 mm diameter by 12 mm thick F75 Co—Cr cylindrical coupon. No metallic supports were applied thereto. A 100 micron bond coat of NiCrAlY was applied to the entire surface of the coupon. A YSZ layer was plasma sprayed over the NiCrAlY and diamond ground down to uniform 1.0 mm layer thereon. No metallic skin was applied.

The testing described in Example 2 above was conducted on the second comparative thermal barrier for 50 cycles. After the first 2 cycles, extensive "mud puddle" cracks across the surface of the YSZ material were visible. During the subsequent about 40 cycles, the "mud puddle" cracks in the YSZ material continued to propagate. Testing was stopped after 50 cycles. The average peak temperature recorded by the thermocouple (at 0.5 mm below the surface on which the YSZ was connected) was about 478° C.

Comparative Example 3

In a third comparative example, a 50 mm diameter by 12 mm thick F75 Co—Cr cylindrical coupon was prepared to simulate an engine surface without any thermal barrier. The testing described in Example 2 above was conducted on the third comparative thermal barrier for 1 cycle. The average peak temperature recorded by the thermocouple (at 0.5 mm below the surface on which the flame was directed) was about 705° C.

Prophetic Comparative Example 4

In this prophetic comparative example, the 2 thermal barriers (from Comparative Examples 1-2 described above) would be subjected to pressure, pulsation, and/or vibration testing described in Prophetic Example 7 above. It is expected that these two composite thermal barriers would behave similar to conventional thermal barriers inside of combustion engines. That is, with the brittle ceramic material directly exposed to the pressurized fluid, the inventors expect rapid failure of the conventional thermal barrier and immediately delamination of the ceramic from the coupon surface.

As used herein, the singular forms "a," "an," and "the" include plural referents unless the context clearly dictates otherwise. Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is also noted that recitations herein refer to a component of the present disclosure being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present disclosure without departing from the spirit and scope hereof. Since modifications combinations, sub-combinations and variations of the disclosed embodiments incorporating the spirit and substance of the disclosure may occur to persons skilled in the art, the present disclosure should be construed to include everything within the scope of the appended claims and their equivalents.

What is claimed is:

1. A composite thermal barrier for a metallic surface within a combustion chamber of an internal combustion engine, the composite thermal barrier comprising:
   at least one metallic support structure connected to a metallic surface within a combustion chamber of an internal combustion engine,
   a metallic skin disposed adjacent to the at least one metallic support structure,
      wherein the metallic skin defines a void space between the metallic skin and the metallic surface,
   an insulation material contained within the void space between the metallic skin and the metallic surface;
   wherein the metallic surface is a piston top surface;
   wherein the at least one metallic support structure is annular and substantially concentric with the piston circumference.

2. The composite thermal barrier of claim 1 wherein the metallic surface is contiguous a combustion reaction within the combustion chamber.

3. The composite thermal barrier of claim 1 wherein the at least one metallic support structure is in the shape of a pillar, a plane, a pyramid, an arch, or a honeycomb.

4. The composite thermal barrier of claim 1 wherein the metallic support structure thickness ranges from 0.1 mm to 5 mm.

5. The composite thermal barrier of claim 4 wherein the ceramic material has a porosity from 10% to 90%.

6. The composite thermal barrier of claim 4 wherein the ceramic material is selected from the group consisting of yttria stabilized zirconia, zirconium dioxide, lanthanum zirconate, gadolinium zirconate, lanthanum magnesium hexaaluminate, gadolinium magnesium hexaaluminate, lanthanum-lithium hexaaluminate, barium zirconate, strontium zirconate, calcium zirconate, sodium zirconium phosphate, mullite, aluminum oxide, cerium oxide, and combinations thereof.

7. The composite thermal barrier of claim 1 wherein the insulation material comprises air, argon, nitrogen, helium, a ceramic material, or combinations thereof.

8. The composite thermal barrier of claim 1 wherein the insulation material is a pressure less than atmospheric pressure.

9. The composite thermal barrier of claim 1 wherein the metallic skin thickness ranges from 0.001 mm to 2 mm.

10. The composite thermal barrier of claim 1 wherein the insulation material has a density gradient in the void space from the metallic skin to the metallic surface.

11. The composite thermal barrier of claim 1 further comprising a heat distribution layer within the volume.

12. A method of applying the composite thermal barrier of claim 1 to a metallic surface within a combustion chamber of an engine, the method comprising:
- preparing a metallic surface within a combustion chamber of an engine for application of the support structure,
- applying the at least one support structure to the metallic surface,
- forming a metallic skin contiguous the at least one support structure to create the void space; and
- inserting the insulation material within the void space between the metallic skin and the metallic surface;
- wherein the metallic surface is a piston top surface;
- wherein the at least one support structure is annular and substantially concentric with the piston circumference.

13. The composite thermal barrier of claim 1 wherein the metallic skin is substantially parallel with the piston top surface.

14. The composite thermal barrier of claim 1 wherein the piston top surface with the metallic skin includes a recessed volume with an edge, the recessed volume continuous a combustion reaction within the combustion chamber.

15. The composite thermal barrier of claim 14 further comprising an annular rim contiguous the combustion reaction within the combustion chamber and the edge of the recessed volume, the annular rim configured to separate the edge from the combustion.

16. A composite thermal barrier for a piston of an internal combustion engine, the composite thermal barrier comprising:
- at least one metallic support structure connected to a metallic surface of a piston within a combustion chamber of an internal combustion engine,
- a metallic skin disposed adjacent to the at least one metallic support structure,
- wherein the metallic skin defines a void space between the metallic skin and the piston metallic surface,
- an insulation material contained within the void space between the metallic skin and the piston metallic surface;
- wherein the support structure is connected to the piston metallic surface by a locking ring that releasably locks with the piston.

17. The composite thermal barrier of claim 16 wherein the insulation material comprises greater than about 40% of a volume of the composite thermal barrier.

18. The composite thermal barrier of claim 16 further comprising a thermal conductivity of about 1 W/m·K to about 8 W/m·K at 400° C.

19. The composite thermal barrier of claim 16 wherein the composite thermal barrier has a thickness of 0.1 mm to less than 5 mm on the piston metallic surface.

20. A composite thermal barrier for a metallic surface within a combustion chamber of an internal combustion engine, the composite thermal barrier comprising:
- at least one metallic support structure connected to a metallic surface within a combustion chamber of an internal combustion engine,
- a metallic skin disposed adjacent to the at least one metallic support structure,
- wherein the metallic skin defines a void space between the metallic skin and the metallic surface,
- an insulation material contained within the void space between the metallic skin and the metallic surface;
- wherein the metallic surface is a piston top surface;
- wherein the piston top surface with the metallic skin includes a recessed volume with an edge, the recessed volume continuous a combustion reaction within the combustion chamber.

* * * * *

UNITED STATES PATENT AND TRADEMARK OFFICE
CERTIFICATE OF CORRECTION

PATENT NO. : 10,302,013 B2
APPLICATION NO. : 15/278696
DATED : May 28, 2019
INVENTOR(S) : Dana Craig Bookbinder et al.

Page 1 of 1

It is certified that error appears in the above-identified patent and that said Letters Patent is hereby corrected as shown below:

On the Title Page

On page 2, Column 2, item (56), other publications, Line 27, delete "Conductvity" and insert
-- Conductivity --, therefor.

Signed and Sealed this
Tenth Day of September, 2019

Andrei Iancu
*Director of the United States Patent and Trademark Office*